United States Patent Office 3,494,982
Patented Feb. 10, 1970

3,494,982
GRAFT COPOLYMER/CHLORINATED POLYETHYLENE BLENDS
Thomas S. Grabowski and Anthony M. Mierzwa, Vienna, W. Va., assignors to Borg-Warner Corporation, a corporation of Illinois
No Drawing. Continuation of application Ser. No. 506,869, Nov. 8, 1965. This application Feb. 10, 1969, Ser. No. 805,089
Int. Cl. C08f *33/08*
U.S. Cl. 260—876  7 Claims

ABSTRACT OF THE DISCLOSURE

Flame-resistant polymer blends comprised of graft polymers of polyconjugated diene-monovinyl aromatic hydrocarbon-acrylic acid nitrile blended with chlorinated polyethylene. The polymer blends have a high degree of stability and flame-resistance combined with excellent physical and chemical properties for the forming of various structural shapes such as sheets, moldings, pipes, valves, fittings and the like.

---

This application is a continuation of Ser. No. 506,869, filed Nov. 8, 1965, now abandoned.

It was well known, prior to this invention, that graft copolymers prepared from polybutadiene, styrene and acrylonitrile exhibited a high degree of environmental stability along with high impact strengths and high heat distortion temperatures. It was also known that it was difficult to extrude graft copolymers that were combined with polyvinyl chloride and/or vinyl chloride copolymers as a means for developing improved flame resistance, inasmuch as they had a tendency to degrade at about 370–400° F. Also, copolymers and blends were not exceptionally stable in the presence of ultraviolet light and tended to become brittle over a period of time. It has been found that if chlorinated polyethylene is mixed with the graft polymer, flame resistance and ultraviolet resistance to embrittlement is improved without observable degradation at extrusion temperatures of 380–410° F.

Briefly described, this invention is a blend of from about 95 parts by weight to about 20 parts by weight of a graft copolymer with correspondingly from about 5 parts by weight to about 80 parts by weight chlorinated polyethylene to provide a flame-resistant, easily extrudable, stable polymeric blend that is highly useful in the fabrication of structural shapes.

In describing the graft copolymer utilized in preparing the blend of this invention, reference may be made to the Report of Nomenclature of the International Union of Pure and Applied Chemistry (published in the Journal of Polymer Science, volume 8, page 260, (1952)) wherein the term "graft copolymerization" is employed to designate a given process. This process is the polymerization of a mixture of polymerizable monomers in the presence of a previously formed polymer of copolymer. A graft copolymer is a high polymer, the molecules of which consist of two or more polymeric parts of different composition chemically united together.

For purposes of this invention, the graft copolymer is produced by polymerization of a conjugated diolefin polymer or copolymer with subsequent polymerization of two separate monomers onto the conjugated diolefin polymer backbone. The conjugated diolefin backbone of this invention is preferably a conjugated aliphatic diolefin homopolymer latex, i.e., polybutadiene, or a conjugated diolefin-monovinyl aromatic hydrocarbon copolymer latex, i.e., butadiene-styrene copolymer. The separate monomers, polymerized on the product of the first polymerization are a mixture of vinyl aromatic hydrocarbons, exemplified by styrene with an acrylic acid nitrile exemplified by acrylonitrile.

The resin portion, i.e., the two monomers polymerized in the presence of the conjugated diolefin polymer or copolymer, comprise from about 40–90 percent by weight of the total composition and the conjugated diolefin polymer or copolymer exemplified by polybutadiene or butadiene-styrene correspondingly comprises from about 60 percent by weight to about 10 percent by weight of the total composition.

The acrylic acid nitrile exemplified by acrylonitrile, of the resin portion, preferably comprises from about 10 to about 40 percent by weight of the three-component mixture (i.e., a rubbery backbone plus resin) and the monovinyl aromatic hydrocarbon, exemplified by styrene, comprises from about 30 to about 70 percent by weight of the total composition.

In the preparation of the rubbery polymeric latex used as the backbone of the graft polymer, the polybutadiene or butadiene-styrene copolymer may be replaced by polymers prepared from isoprene, pentadiene-1,3, the methyl-1,3-pentadienes, dimethyl butadiene-1,3; the 1,3- and 2,4-hexadienes, and the like, including mixtures of two or more such conjugated diolefins (including butadiene-1,3).

The styrene in the copolymers of the rubbery backbone as well as of the resin portion of the graft polymer may be replaced in part or entirely by other vinyl aromatic hydrocarbons such as vinyl toluene, α-methylstyrene, α-methylvinyltoluene, and the like as well as mixtures thereof.

The acrylic acid nitriles exemplified by acrylonitrile may be replaced in whole or in part by methacrylonitrile, ethacrylonitrile and the like as well as mixtures thereof.

The chlorinated polyethylene that is blended with graft polymer is a chlorinated polyethylene containing chlorine in a range of from about 20 percent to about 55 percent by weight chlorine. The polyethylene is derived from either a high density linear polyethylene or a low density high pressure polyethylene.

As mentioned, it is desirable to use from about 95 parts by weight to about 20 parts by weight of graft polymer and correspondingly from about 5 parts by weight to about 80 parts by weight of the chlorinated polyethylene. Within this range of polymeric materials, a flame-retardant, easily extrudable material is obtained, which has good impact strength, good tensile strength and may be utilized in a variety of different applications requiring stability during extrusion and other converting methods that may be applicable. It will be noted, in the examples hereinbelow, that in addition to the graft copolymer and chlorinated polyethylene, there are other materials added to the blend such as lubricants, stabilizers and acid acceptors.

The acid acceptor utilized in this invention may be one that is normally used as a stabilizer for vinyl chloride polymers such as lead compounds, metal oxides and the like. The specific acid acceptor illustrated in the examples is dibutyl tin maleate. The amount of acid acceptor may vary from about ½ part to in excess of 5 parts per 100 parts of graft copolymer-chlorinated polyethylene blend. If insufficient acid acceptor is present, the free hydrogen chloride liberated will cause discoloration and weakening of the blend while an excess of acid acceptor will be of no value and will merely add expense as well as filler to the composition.

Additional flame-retardants such as antimony oxide, or other flame retardants, may also be utilized with equal effectiveness to further improve flame retardancy.

In the examples below, the compositions of this invention were prepared utilizing conventional machinery in mixing the graft polymer with the chlorinated polyethylene. The polymer compositions were masticated along with the lubricant, stabilizer, acid acceptor and flame-retardant for from 2–5 minutes at temperatures of from about 300° F. to about 400° F. on an internal mixer, i.e., Banbury mixer. It is to be understood that external mixers such as a roll mill could also be used. The examples are set forth in tabular form hereinbelow and for illustrative purposes, the graft copolymers utilized contained from about 10 parts by weight to about 50 parts by weight polybutadiene with from about 18 to about 30 parts by weight acrylonitrile and approximately 30 parts by weight to about 50 parts by weight styrene polymerized in the presence of the polybutadiene.

Examples 1–15 utilized a graft polymer containing about 20 parts by weight polybutadiene, about 30 parts by weight acrylonitrile, and about 50 parts by weight styrene. Examples 16–30 utilized a graft polymer A containing about 50 parts by weight polybutadiene, about 18 parts by weight acrylonitrile and about 32 parts by weight styrene along with a graft polymer B containing about 10 parts by weight polybutadiene, about 27 parts by weight acrylonitrile and about 63 parts by weight styrene plus α-methylstyrene. Examples 1 through 9 and 16–30 utilized a chlorinated polyethylene having a chlorine content of about 40 percent by weight and Examples 10 and 11 utilized a chlorinated polyethylene having a chlorine content of about 25 percent. Examples 12 through 15 utilized a chlorinated polyethylene having a chlorine content of about 53 percent. In the examples, all parts are by weight unless otherwise indicated.

TABLE I

|  | 1 | 2 | 3 | 4 | 5 | 6 | 7 | 8 | 9 |
|---|---|---|---|---|---|---|---|---|---|
| Graft polymer | 95 | 90 | 80 | 70 | 60 | 50 | 40 | 30 | 20 |
| Chlorinated polyethylene | 5 | 10 | 20 | 30 | 40 | 50 | 60 | 70 | 80 |
| Lubricant (polyoxyalkylene derivative of propylene glycol) | .5 | .5 | .5 | .5 | .5 | .5 | .5 | .5 | .5 |
| Stabilizer (dibutyl tin maleate) | 1.0 | 1.0 | 1.0 | 1.0 | 1.0 | 1.0 | 1.0 | 1.0 | 1.0 |
| Tensile at yield (p.s.i.) | 5,300 | 4,900 | 4,200 | 3,200 | 2,600 | 1,800 | 1,200 | 900 | |
| Elongation (percent) 73° F | 25 | 65 | 130 | 160 | 235 | 358 | 381 | 408 | 540 |
| Tensile Modulus (×10⁵) p.s.i | 3.0 | 2.8 | 2.5 | 2.0 | 1.5 | 1.0 | Void | .5 | .1 |
| Ultimate tensile strength, p.s.i | | | | 3,600 | 3,500 | 3,200 | 2,500 | 2,800 | |
| Heat distortion temperature at 66 p.s.i | 203 | 198 | 199 | 193 | 188 | 185 | 165 | 157 | 102 |
| Melt index | 1.5A1 | .8A1 | .4A1 | .4A3 | .1A3 | .1A3 | WNE | WNE | ¹ WNE |
| Hardness (Shore D) | 81 | 80 | 78 | 74 | 72 | 68 | 61 | 56 | 48 |
| Impact ⅛" at room temperature (ft. lbs./in.) | 2.6 | 2.5 | 3.4 | 3.9 | 14.1 | ² NF | ² NF | ² NF | ² NF |
| Impact ⅛" at −40° F. (ft. lbs./in.) | .9 | .8 | .7 | .9 | .8 | .8 | 1.0 | .8 | 1.0 |
| Impact ½" at room temperature (ft. lbs./in.) | 2.4 | 1.8 | 3.1 | 4.1 | 10.6 | 15.6 | ² NF | ² NF | ² NF |

¹ Would not Extrude.  ² No Failure.

TABLE II

|  | 10 | 11 | 12 | 13 | 14 | 15 |
|---|---|---|---|---|---|---|
| Graft polymer | 95 | 80 | 95 | 80 | 50 | 20 |
| Chlorinated polyethylene (chlorine content, 25%) | 5 | 20 | | | | |
| Chlorinated polyethylene (chlorine content, 53%) | | | 5 | 20 | 50 | 80 |
| Stabilizer (dibutyl tin maleate) | 1.0 | 1.0 | 1.0 | 1.0 | 1.0 | 1.0 |
| Lubricant (polyoxyalkylene derivative of propylene glycol) | .5 | .5 | .5 | .5 | .5 | .5 |
| Tensile at yield, p.s.i | 5,700 | 3,400 | 6,000 | 6,200 | 6,100 | 6,300 |
| Elongation (percent) | 10 | 6 | 8 | 8 | 6 | 6 |
| Tensile modulus (×10⁵) p.s.i | 2.8 | 2.1 | 3.0 | 3.2 | 3.2 | 3.6 |
| Melt index | 1.5A½ | 1.4A¼ | 1.6A½ | 1.3A¼ | .9B½ | 1.5B¼ |
| Hardness (R) | 97 | 78 | 101 | 102 | 101 | 99 |
| Heat distortion temperature at 264 p.s.i | 176 | 70 | 178 | 174 | 116 | 128 |
| Impact at room temperature (ft. lbs./in.) | 5.3 | 2.8 | 2.4 | 1.6 | | |
| Impact at −40° F. (ft. lbs./in.) | .9 | .6 | .9 | .5 | | |

TABLE III

|  | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Chlorinated polyethylene | 10 | 10 | 10 | 20 | 20 | 20 | 33 | 40 | 40 | 45 | 45 | 50 | 50 | 60 | 80 |
| Graft polymer A | 45 | 10 | 80 | 40 | 20 | 60 | 33 | 20 | 40 | 10 | 45 | 0 | 50 | 20 | 10 |
| Graft polymer B | 45 | 80 | 10 | 40 | 60 | 20 | 33 | 40 | 20 | 45 | 10 | 50 | 0 | 20 | 10 |
| Hardness Shore D | 65 | 75 | 57 | 65 | 70 | 57 | 60 | 60 | 50 | 60 | 45 | 60 | 40 | 45 | 35 |
| Elongation, percent 73° F | | | 200 | 150 | 150 | 200 | 200 | 250 | 250 | 300 | 350 | 300 | 400 | 350 | 400 |
| Tear strength, "G" die, #/in | 265 | 430 | 198 | 256 | 325 | 244 | 317 | 292 | 225 | 309 | 191 | 306 | 156 | 208 | 150 |
| Tensile strength, p.s.i., 73° F | 3,400 | 5,500 | 2,600 | 3,250 | 3,800 | 2,800 | 3,300 | 3,250 | 2,650 | 3,200 | 2,600 | 3,400 | 2,300 | 2,800 | 2,400 |

The examples of this invention illustrate the blending of the graft polymer and the chlorinated polyethylene in various amounts and indicate the physical properties thereof. It will be noted that for the purposes of illustration, other additives have been included, such as lubricants, stabilizers and the like. Also, from about 2 percent to about 5 percent of a flame-retardant (antimony oxide) may be utilized to provide additional flame retarding properties to the blend, however, it will be noted that chlorinated materials improve flame-resistance over those materials not having chlorine or other halogen substituents.

It will be understood that many widely different embodiments of this invention may be made without departing from the spirit and scope thereof and it will be understood that this invention is not limited to the specific embodiments shown herein except as defined in the appended claims.

What is claimed is:

1. A mechanical blend consisting of from (a) about 95 parts by weight to about 20 parts by weight of a graft polymer obtained by polymerizing a mixture of about 30 percent by weight to about 70 percent by weight of monovinyl aromatic hydrocarbon and 10 percent by weight to about 40 percent by weight of an acrylic acid nitrile in the presence of from about 10 percent by weight to about 60 percent by weight of a material selected from the group consisting of conjugated aliphatic diolefin homopolymer latices and conjugated aliphatic diolefin-monovinyl aromatic hydrocarbon copolymer latices and (b) correspondingly from about 5 parts by weight to about 80 parts by weight of a chlorinated polyethylene, said chlorinated polyethylene containing chlorine in an amount of from about 20 percent to about 55 percent by weight of the chlorinated polyethylene.

2. The blend of claim 1 wherein the graft polymer is prepared by polymerizing styrene and acrylonitrile in the presence of polybutadiene.

3. The blend of claim 1 wherein the graft polymer is prepared by polymerizing styrene and acrylonitrile in the presence of a butadiene-styrene rubbery copolymer.

4. The blend of claim 1 wherein the graft polymer is prepared by polymerizing about 50 parts by weight of styrene and about 30 parts by weight of acrylonitrile in the presence of about 20 parts by weight of polybutadiene.

5. The blend of claim 1 wherein the graft polymer is prepared by polymerizing styrene and acrylonitrile in the presence of polybutadiene and wherein the chlorinated polyethylene contains about 20 to about 55 parts by weight of chlorine.

6. The blend of claim 1 wherein the graft polymer is prepared by polymerizing a monovinyl aromatic hydrocarbon selected from the group consisting of styrene, α-methylstyrene, and vinyl toluene and an acrylic acid nitrile selected from the group consisting of acrylonitrile, methacrylonitrile and ethacrylonitrile in the presence of a conjugated aliphatic diolefin selected from the group consisting of isoprene, dimethyl butadiene-1,3; 1,3-hexadienes; pentadiene-1,3; methyl-1,3-pentadiene and butadiene-1,3.

7. The blend of claim 1 wherein an antimony oxide flame-retardant additive is added to the mechanical blend in an amount of from about 2.0 to about 5.0 percent by weight of the total composition.

References Cited

UNITED STATES PATENTS

| | | | |
|---|---|---|---|
| 3,227,781 | 1/1966 | Klug et al. | 260—897 |
| 3,269,963 | 8/1966 | Ilgemann et al. | 260—876 |
| 3,326,833 | 6/1967 | Roley | 260—890 |

FOREIGN PATENTS

| | | |
|---|---|---|
| 626,534 | 8/1961 | Canada. |
| 1,374,957 | 9/1964 | France. |

SAMUEL H. BLECH, Primary Examiner

M. J. TULLY, Assistant Examiner

U.S. Cl. X.R.

260—29.7, 45.75, 890, 897